United States Patent Office 2,947,730

Patented Aug. 2, 1960

2,947,730

POLYMERS OF VINYLPENTACHLOROPHENYL SULFIDE AND METHOD OF MAKING THE SAME

Earl D. Holly and William R. Nummy, Midland, Mich., assignors to The Dow Chemical Company, Midland, Mich., a corporation of Delaware No Drawing. Filed Jan. 3, 1957, Ser. No. 632,265

10 Claims. (Cl. 260—79.7)

This invention concerns certain new polymeric products and a method of making the same. It relates more particularly to polymerized vinylpentachlorophenyl sulfide and copolymers of vinylpentachlorophenyl sulfide with other coplymerizable vinyl or vinylidene compounds.

Monomeric vinylpentachlorophenyl sulfide and a method of making the same is described in U.S. application, Serial No. 632,266 filed on even date herewith by Holly and Vasicek, Patent No. 2,832,806. In purified form the compound is a white crystalline material melting at about 74.6°–75.3° C. and has the empirical formula

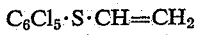

$$C_6Cl_5 \cdot S \cdot CH{=}CH_2$$

It is an object of the invention to prepare polymers of vinylpentachlorophenyl sulfide. Another object is to provide new polymeric products comprising polymerized vinylpentachlorophenyl sulfide. A further object is to provide thermoplastic polymeric products consisting essentially of vinylpentachlorophenyl sulfide copolymerized with one or more other copolymerizable vinyl or vinylidene compounds. Other objects will appear from the following description of the invention.

According to the invention the new polymeric products are prepared by polymerizing vinylpentachlorophenyl sulfide alone or copolymerizing vinylpentachlorophenyl sulfide with one or more other copolymerizable vinyl or vinylidene compounds to form useful polymers having a combination of unusual properties.

The polymeric products range from rubber-like substances to hard thermoplastic materials. The homopolymers of vinylpentachlorophenyl sulfide are hard thermoplastic resinous materials having a high softening point and are self-extinguishing or non-flammable materials. Copolymers of the vinylpentachlorophenyl sulfide with other copolymerizable vinyl or vinylidene compounds containing 20 percent or more on a molar basis of the vinylpentachlorophenyl sulfide chemically combined in the polymer molecule are self-extinguishing materials and are useful in view of the combination of physical properties along with the self-extinguishing or non-flammable properties imparted by the vinylpentachlorophenyl sulfide.

The vinyl pentachlorophenyl sulfide can be copolymerized with monoethylenically unsaturated vinyl or vinylidene compounds such as styrene, vinyltoluene, vinylxylene, ethylvinylbenzene, isopropylstyrene, chlorostyrene, dichlorostyrene, vinyl chloride, vinyl acetate, ethyl vinyl ether, butyl vinyl ether, methyl acrylate, ethyl acrylate, butyl acrylate, methyl methacrylate, ethyl methacrylate, hexyl methacrylate, methyl vinyl ketone, methyl isopropenyl ketone, or acrylonitrile to form thermoplastic polymeric products, or with divinyl compounds such as divinylbenzene, divinyl ether, divinyl ethers of mono-, di-, tri- or tetraethylene glycols, diallyl ether or diallyl phthalate to form insoluble or cross-linked copolymers which are useful for a variety of purposes, and which are self-extinguishing or flame-proof materials when they contain 20 percent or more on a molar basis of the vinylpentachlorophenyl sulfide chemically combined in the polymer molecule.

The polymerization can be carried out in mass, in a solvent for the monomers or while having the monomers dispersed in an aqueous medium such as water or brine or in aqueous emulsion, at temperatures between about 60° and 140° C. and in the presence of a polymerization catalyst. The polymerization can be carried out at atmospheric, subatmospheric or superatmospheric pressures, but is usually carried out under the autogenous pressure of the mixture of the materials at the polymerization temperature employed.

The polymerization catalyst can be a free-radical type catalyst or an ionic-type catalyst such as boron trifluoride. Suitable catalysts are benzoyl peroxide, lauryl peroxide, cumene peroxide, cumene hydroperoxide, diisopropylbenzene hydroperoxide, tert.-butyl hydroperoxide, di-tert.-butyl peroxide, di-tert.-butyl perbenzoate, di-tert.-butyl diperphthalate, potassium persulfate, hydrogen peroxide, or azo compounds such as azobis 2,2′-isobutyronitrile. The amount of catalyst employed is generally small and is usually between 0.001 and 5 percent by weight of the polymerizable monomers.

Although the homopolymer of vinylpentachlorophenyl sulfide can be prepared by the invention, copolymers with other polymerizable vinyl or vinylidene compounds possess greater utility in view of the combination of physical properties, together with the properties, notably flameproofing, imparted by the vinylpentachlorophenyl sulfide.

The polymeric compositions of the invention include homopolymers, i.e. polymerized vinylpentachlorophenyl sulfide, and copolymers of said compound with other polymerizable vinyl or vinylidene compounds in proportions of from 5 to 95, preferably from 20 to 50, percent on a molar basis of the vinylpentachlorophenyl sulfide chemically combined in the copolymer molecule.

The polymers may be combined with plasticizers, stabilizers, pigments, fillers, dyes or other synthetic resins which are compatible therewith.

The following examples illustrate ways in which the principle of the invention has been applied, but are not to be construed as limiting its scope.

EXAMPLE 1

A charge of 5 grams of vinylpentachlorophenyl sulfide melting at temperatures between 74.6° and 75.3° C., and 0.005 gram of azobis 2,2′-isobutyronitrile as polymerization catalyst was sealed in a glass ampoule and polymerized by heating at a temperature of 80° C. for a period of 36 hours. The polymer was removed from the ampoule by dissolving it in benzene. The benzene solution was poured into methyl alcohol and the polymer precipitated. The polymer was separated by filtering and was washed and dried. There was obtained 2.5 grams of polymerized vinylpentachlorophenyl sulfide as a white powder. The polymer did not burn when held in an open flame. The polymer melted at temperatures between 160° C. and 165° C. Fibers could be drawn from the molten polymer. A compression molding of the polymer was a transparent sheet.

EXAMPLE 2

In each of a series of experiments, a mixture of vinylpentachlorophenyl sulfide and styrene in molar proportions as stated in the following table was sealed in a glass ampoule, together with 0.1 percent, based on the weight of the monomers of azobis 2,2′-isobutyronitrile as polymerization catalyst. The mixture was heated in the sealed ampoule at a temperature of 80° C. until from 5 to 12 percent by weight of the monomers were polymerized. Thereafter, the ampoule was cooled, the contents removed and the polymer recovered by precipitating a solution of the same in benzene with methyl alcohol. The recovered copolymer was washed, dried and analyzed to determine its composition. Other portions of the copolymer were used to determine a melting point (capillary tube) for the product and a burning characteristic. The procedure for determining the burning characteristic for the copolymer was to hold a portion of the copolymer in an open flame until it was burning then withdraw the polymer from the flame and observe whether it continued to burn or extinguished itself. Table I identifies the experiments by giving the molar proportions of the monomers employed in making the copolymers. The table gives the percent conversion or percent of polymer obtained, based on the weight of the monomers initially used and gives the composition of the copolymer expressed as mole percent of the monomeric ingredients. The table also gives a melting point for the copolymer and a burning characteristic for the copolymer. All of the copolymers were thermoplastic resins.

*Table I*

| Run No. | Monomer Starting Materials | | Polymerization, Percent | Copolymer Product | | | Remarks |
|---|---|---|---|---|---|---|---|
| | Styrene, mole, Percent | Vinylpentachlorophenyl sulfide, mole Percent | | Styrene, mole Percent | Vinylpentachlorophenyl sulfide, mole Percent | Melting Point, ° C. | |
| 1 | 84 | 16 | 5 | 94.8 | 5.2 | 140–150 | Burns. |
| 2 | 68 | 32 | 6 | 90.0 | 10.0 | 145–158 | Do. |
| 3 | 50 | 50 | 5 | 79.7 | 20.3 | 135–145 | Burns poorly. |
| 4 | 33 | 67 | 8.7 | 67.0 | 33.0 | 155–159 | Self-extinguishing. |
| 5 | 20 | 80 | 6.6 | 54.8 | 45.2 | 155–157 | Do. |
| 6 | 10 | 90 | 12 | 32.5 | 67.5 | 160–165 | Do. |

EXAMPLE 3

A charge of 7.7 grams of vinylpentachlorophenyl sulfide and 6.95 grams of styrene, together with 0.012 percent, based on the weight of the monomers of cumene hydroperoxide, was sealed in a glass ampoule and heated at temperatures between 80° and 135° C. for a period of 16 hours. Thereafter, the ampoule was cooled and the polymer recovered by dissolving it in benzene, then precipitating the polymer with methyl alcohol. The copolymer was washed and dried. There was obtained 7.6 grams of copolymer as a white powder having a softening point of 120° C. and an intrinsic viscosity of 0.6. The copolymer was thermoplastic and could be molded under heat and pressure. It was self-extinguishing when ignited.

EXAMPLE 4

In each of a series of experiments, a mixture of vinylpentachlorophenyl sulfide and methyl acrylate in molar proportions as stated in the following table was sealed in a glass ampoule, together with 0.1 percent, based on the weight of the monomers, of azobis 2,2′-isobutyronitrile as polymerization catalyst. The mixture was heated in the sealed ampoule at a temperature of 80° C. until a portion of the monomers was polymerized. Thereafter, the ampoule was cooled, the contents removed and the copolymer recovered by dissolving it in benzene and precipitating the copolymer with methyl alcohol. The recovered copolymer was washed, dried and analyzed to determine its composition. The copolymer was tested to determine a burning characteristic employing procedure similar to that employed in Example 2. Table II identified the experiments by giving the molar proportions of the monomers employed in making the copolymers and gives the percent of polymerization. The table also gives the composition of the copolymer and a burning characteristic for the same.

*Table II*

| Run No. | Monomer Starting Materials | | Polymerization, Percent | Copolymer | | Remarks |
|---|---|---|---|---|---|---|
| | Methyl Acrylate, mole Percent | Vinylpentachlorophenyl sulfide, mole Percent | | Methyl Acrylate, mole Percent | Vinylpentachlorophenyl sulfide, mole Percent | |
| 1 | 90 | 10 | 23 | 91.2 | 9.8 | Burns. |
| 2 | 80 | 20 | 26 | 79.9 | 20.1 | Self-extinguishing. |
| 3 | 70 | 30 | 28 | 72.5 | 27.5 | Do. |
| 4 | 55 | 45 | 12 | 62.6 | 37.4 | Do. |
| 5 | 37 | 66 | 10 | 42.8 | 57.2 | Do. |
| 6 | 89 | 11 | 2.6 | 26.8 | 73.2 | Do. |

EXAMPLE 5

A charge of 15.4 grams of vinylpentachlorophenyl sulfide and 13.21 grams of methyl acrylate, together with 0.01 percent, based on the weight of the monomers, of cumene hydroperoxide was sealed in a glass ampoule and heated at a temperature of 80° C. for a period of 5 days. Thereafter, the ampoule was cooled and the polymer removed by dissolving it in benzene. The copolymer was precipitated with methyl alcohol, was separated, washed and dried. There was obtained 10.08 grams of copolymer as a white powder having a softening point of 83° C. The copolymer was self-extinguishing when ignited in an open flame. One gram of the copolymer dissolved in 100 ml. of chloroform at 25° C. to form a solution having a specific viscosity of 0.68.

EXAMPLE 6

A mixture of 50 mole percent of vinylpentachlorophenyl sulfide and 50 mole percent of acrylonitrile, together with 0.05 percent by weight of azobis 2,2′-isobutyronitrile as polymerization catalyst, was sealed in a glass ampoule and heated at a temperature of 80° C. for a period of 23.5 hours. Thereafter, the ampoule was cooled and the copolymer removed by dissolving it in benzene.. The copolymer was precipitated with methyl alcohol, was separated by filtering, washed and dried. The copolymer was a white powder having a melting point of 183° C. and contained 47 mole percent of acrylonitrile by analysis. The copolymer was thermoplastic and was self-extinguishing when ignited in an open flame. The copolymer was obtained in amount corresponding to 66 percent yield, based on the monomers initially used.

We claim:

1. A solid polymeric composition of matter consisting essentially of from 20 to 50 percent on a molar basis of vinylpentachlorophenyl sulfide copolymerized with from 80 to 50 mole percent of at least one other monoethylenically copolymerizable vinyl compound selected from the group consisting of (*a*) monovinyl aromatic hydrocarbons of the benzene series, (*b*) alkyl esters of acrylic acid, and (*c*) acrylonitrile.

2. A solid polymeric composition of matter consisting essentially of from 20 to 50 mole percent of vinylpentachlorophenyl sulfide copolymerized with from 80 to 50 mole percent of a monovinyl aromatic hydrocarbon of the benzene series.

3. A solid polymeric composition of matter consisting essentially of from 20 to 50 mole percent of vinylpentachlorophenyl sulfide copolymerized with from 80 to 50 percent of an alkyl ester of acrylic acid.

4. A polymeric composition as claimed in claim 3, wherein the ester of acrylic acid is methyl acrylate.

5. A solid polymeric composition of matter consisting essentially of from 20 to 50 mole percent of vinylpentachlorophenyl sulfide copolymerized with from 80 to 50 mole percent of acrylonitrile.

6. A method of making a polymeric composition of matter which comprises polymerizing a mixture of copolymerizable monomers consisting of from 20 to 50 mole percent of vinylpentachlorophenyl sulfide and from 80 to 50 mole percent of at least one other vinyl compound selected from the group consisting of (*a*) monovinyl aromatic hydrocarbons of the benzene series, (*b*) alkyl esters of acrylic acid and (*c*) acrylonitrile, by bringing the mixture of the monomers into contact with a free-radical type polymerization catalyst at temperatures between 60° and 140° C.

7. A method of making a polymeric composition of matter which comprises polymerizing a mixture of copolymerizable monomers consisting of from 20 to 50 mole percent of vinylpentachlorophenyl sulfide and from 80 to 50 mole percent of styrene by bringing the mixture of the monomers into contact with a free-radical type polymerization catalyst at temperatures between 60° and 140° C.

8. A method of making a polymeric composition of matter which comprises polymerizing a mixture of copolymerizable monomers consisting of from 20 to 50 mole percent of vinylpentachlorophenyl sulfide and from 80 to 50 mole percent of methyl acrylate into contact with a free-radical type polymerization catalyst at temperatures between 60° and 140° C.

9. A method of making a polymeric composition of matter which comprises polymerizing a mixture of copolymerizable monomers consisting of from 20 to 50 mole percent of vinylpentachlorophenyl sulfide and from 80 to 50 mole percent of acrylonitrile by bringing the mixture of the monomers into contact with a free-radical type polymerization catalyst at temperatures between 60° and 140° C.

10. A solid polymeric composition of matter consisting essentially of from 20 to 50 mole percent of vinylpentachlorophenyl sulfide copolymerized with from 80 to 50 mole percent of styrene.

References Cited in the file of this patent

UNITED STATES PATENTS 2,490,875 Landau ---------------- Dec. 13, 1949
2,737,529 Bradley ---------------- Mar. 6, 1956

OTHER REFERENCES

Price et al.: J. Am. Chem. Soc., 75, 4747–4750, 1953.